United States Patent
Matsumura

(10) Patent No.: US 6,663,037 B2
(45) Date of Patent: Dec. 16, 2003

(54) PRETENSIONER

(75) Inventor: Norio Matsumura, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,679

(22) Filed: Aug. 6, 2002

(65) Prior Publication Data

US 2003/0029953 A1 Feb. 13, 2003

(30) Foreign Application Priority Data

Aug. 9, 2001 (JP) ........................................ 2001-241785

(51) Int. Cl.$^7$ ............................................... B60R 22/46
(52) U.S. Cl. ........................................ 242/374; 280/806
(58) Field of Search ........................ 242/374; 280/806; 297/478, 480; 60/632, 638

(56) References Cited

U.S. PATENT DOCUMENTS

| 4,442,674 A | | 4/1984 | Föhl | |
| 4,444,010 A | * | 4/1984 | Bendler | 242/374 |
| 5,690,295 A | * | 11/1997 | Steinberg et al. | 242/374 |
| 6,446,897 B1 | * | 9/2002 | Arima et al. | 242/374 |

FOREIGN PATENT DOCUMENTS

JP      2001-063519      3/2001

* cited by examiner

*Primary Examiner*—John M. Jillions
(74) *Attorney, Agent, or Firm*—Foley & Lardner

(57) ABSTRACT

A pretensioner having a plurality of force transmitting members contained in a tube. One of the force transmitting members is configured to be difficult to deform, to thereby provide for smooth movement of the force transmitting members. A piston receives gas pressure from a gas generator. When gas is released by the gas generator the piston deforms and wedges into a space between the outer peripheral surface of the adjacent force transmitting member and the inner peripheral surface of the tube. Then, the barrel-like force transmitting member presses the piston backward due to force produced by the withdrawing of a seat belt due to the operation of EA. The force transmitting members and the piston can smoothly move because the wedging amount of the piston into the space between the tube wall and the force transmitting member is small.

16 Claims, 6 Drawing Sheets

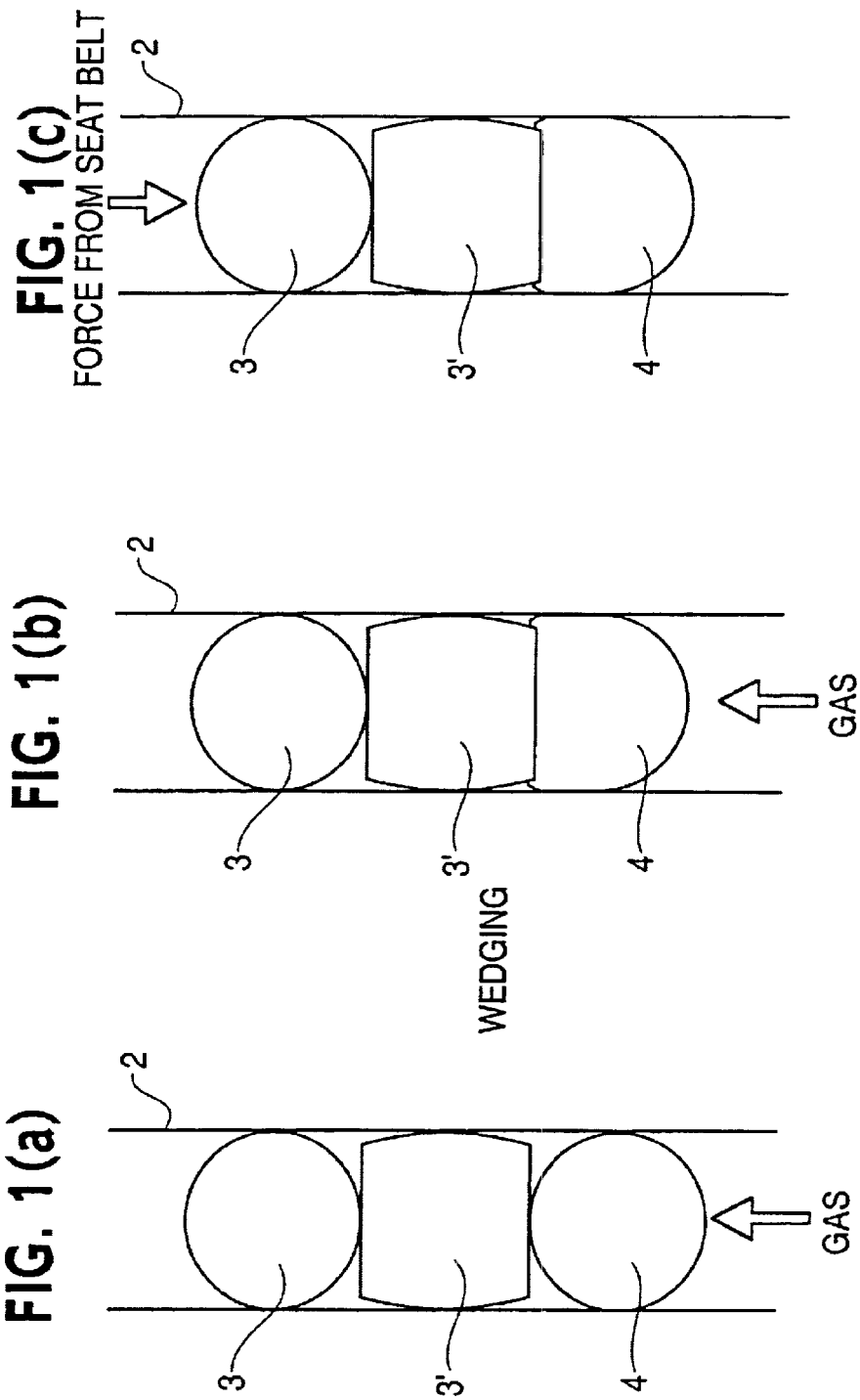

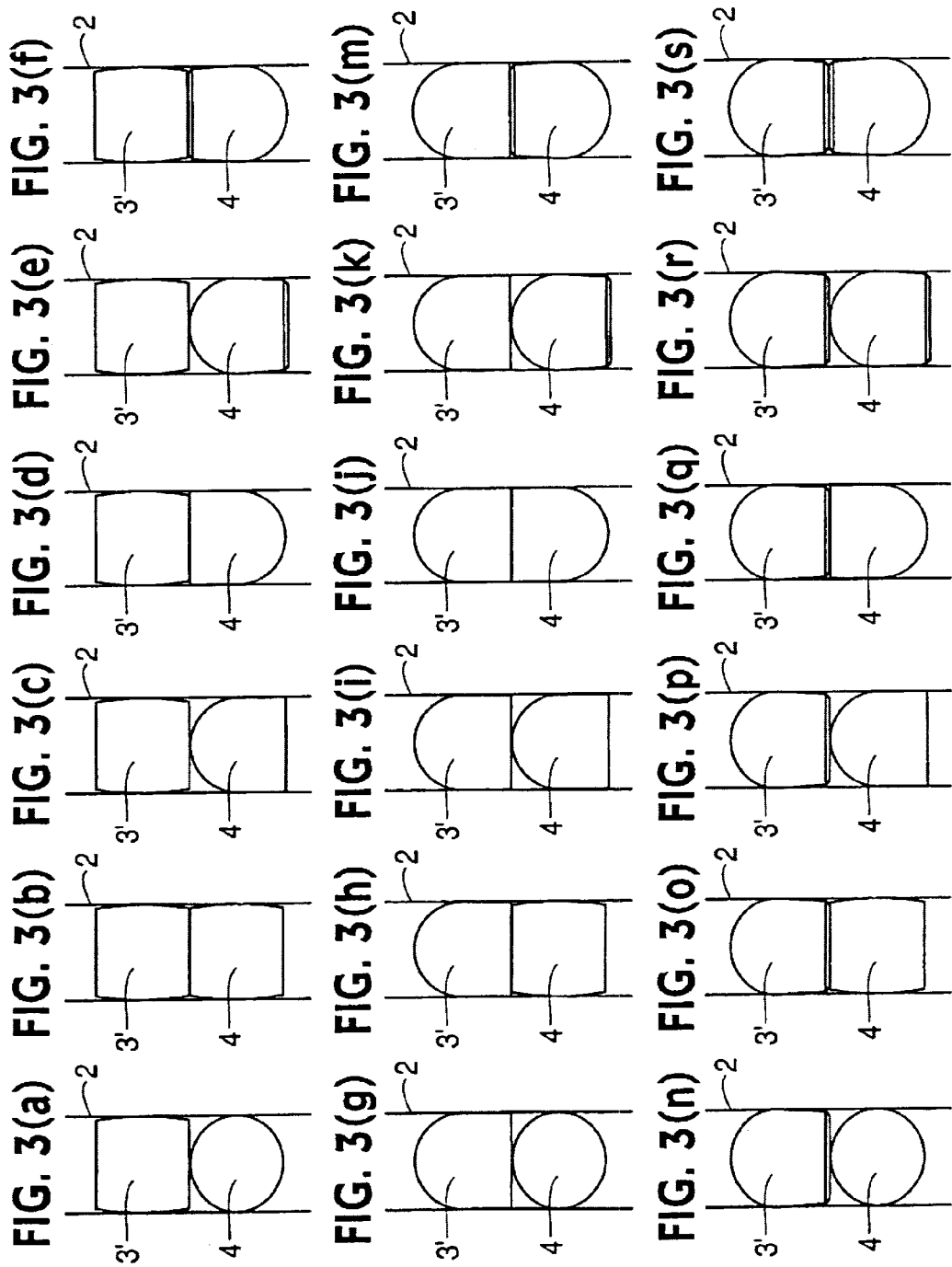

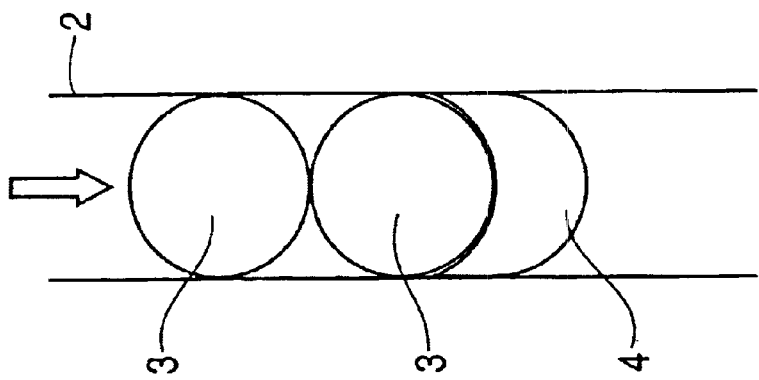
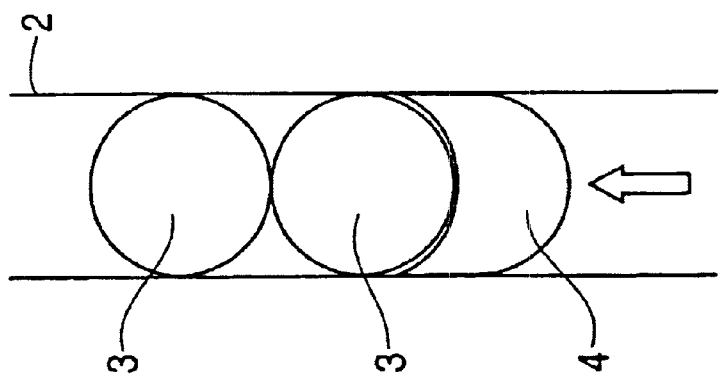
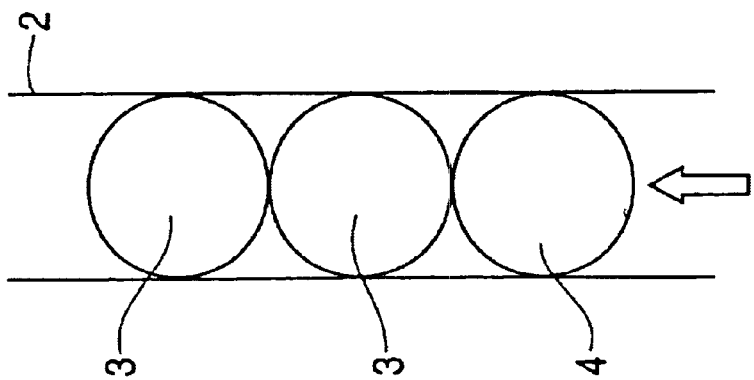

PRETENSIONER

BACKGROUND OF THE INVENTION

The present invention relates to a technical field of a pretensioner (hereinafter, sometimes referred to as "PT") which rotates a reel shaft of a seat belt retractor in a belt-winding direction by reaction gas at an early stage in emergency event such as a vehicle collision, thereby increasing the force of restraining an occupant by a seat belt and, more particularly, relates to a technical field of a pretensioner comprising a piston which receives gas pressure of reaction gas and thereby produces force, and a plurality of force transmitting members for transmitting the force produced by the piston to a reel shaft of a seat belt retractor.

Vehicles such as automobiles are equipped with seat belt devices. In recent years, various kinds of seat belt devices with pretensioners have been developed. A pretensioner is a device for rapidly removing slack of a seat belt and also applying tension to the seat belt to increase the force of restraining an occupant by rotating a reel shaft of a seat belt retractor in the belt winding direction by the reaction gas generated by a gas generator at an early stage in emergency event such as a vehicle collision.

As an example of conventional pretensioners, a pretensioner has been proposed in Japanese Patent Unexamined Publication No. 2001-63519 (incorporated by reference herein), which comprises a piston which receives gas pressure of reaction gas and thereby produces force, and a plurality of force transmitting members, composed of balls, for transmitting the force produced by the piston to a reel shaft of a seat belt retractor.

FIGS. 4(a) and 4(b) disclose a pretensioner disclosed in the aforementioned publication, wherein FIG. 4(a) is a sectional view showing the pretensioner in non-operational state and FIG. 4(b) is a sectional view similar to FIG. 4(a) but showing the pretensioner during winding-up a seat belt.

FIGS. 4(a) and 4(b) disclose a pretensioner (PT) 1, a pipe 2 having an open end 2a, a plurality of force transmitting members 3 which are movably disposed to be in contact with each other within the pipe 2 and are each composed of a metal ball made of iron, aluminum, or the like. A piston 4 is movably disposed within the pipe 2 to receive gas pressure of reaction gas and is composed of a ball made of material having sealing function such as silicone rubber and resin. A pressure vessel 5 having a pipe-like shape is connected to a proximal end 2b of the pipe 2. A gas generator 6 is housed in the pressure vessel 5. A ring gear 7 is positioned to enter into the pipe 2 through a cut-out portion 2c formed near the end of the pipe 2. Levers 8, 9 project from the outer periphery of the ring gear 7. Internal teeth 10 are formed on the inner peripheral surface of the ring gear 7. FIGS. 4(a) and 4(b) also disclose a reel shaft 11 of a seat belt retractor and a pinion 12 fixed to the outer periphery of the reel shaft 11. External teeth 13 are formed on the outer periphery of the pinion 12. A casing 14 is provided for receiving the force transmitting members 3 out of the pipe 2. A gear holder 15 is provided for retaining the ring gear 7 in a home position where the internal teeth 10 of the ring gear 7 do not mesh with the external teeth 13 of the pinion 12. A pair of pins 16, 17 are studded on the gear holder 15 for holding levers 19, 20 therebetween.

The pipe 2 forms a tube path curved in substantially flat oval shape. The force transmitting members 3 and the piston 4 housed in the pipe are guided to move along the tube path. Generally, the PT 1 is integrally installed in a frame of the seat belt retractor.

In the conventional PT 1, the front-most force transmitting member 3 is held in a position where it is in contact with the lever 8 of the ring gear 7 as shown in FIG. 4(a). The other force transmitting members 3 and the piston 4 are held in the illustrated state when the PT 1 is not operating (normal state). In addition, the levers 9 of the ring gear 7 are held between pairs of pins 16, 17 of the gear holder 15, respectively, in order to retain the ring gear 7 in the home position, shown in FIG. 4(a). As a result, the internal teeth 10 of the ring gear 7 are held in a position in which they do not mesh with the external teeth 13 of the pinion 12.

As the vehicle suffers an emergency event such as a collision, the event is sensed and the gas generator 6 is actuated to generate reaction gas into the pressure vessel 5. The gas is introduced into the pipe 2 and directs toward the piston 4 as shown by an arrow A. The piston 4 receives the gas pressure of the gas so as to produce force pushing the force transmitting members 3. The force is transmitted to the lever 8 of the ring gear 7 via the force transmitting members 3 which are in contact with each other.

The piston 4 is deformed easier than the force transmitting members 3 because the force transmitting members 3 are made of metal for achieving effective force transmission and the piston 4 is made of material such as resin for enabling the enlargement of the diameter of the piston 4 to seal the tube and prevent gas leak by. Therefore, during the force transmission, the piston 4 is deformed in the operational direction of gas pressure by the gas pressure and the reaction force from the force transmitting member 3 adjacent to the piston 4. The diameter of the piston 4 is enlarged so that the pressure at the contact area of the piston 4 relative to the inner peripheral surface of the pipe 2 is increased, thereby creating the sealing function for sealing the gas pressure.

As the pushing force is transmitted to the lever 8 of the ring gear 7, torque in the belt-winding direction B (the counter-clockwise direction in FIGS. 4(a), 4(b)) is produced on the ring gear 7. The pins 16, 17 holding the levers 19, 20 are sheared by the torque so as to release the ring gear 7 from being retained in the home position by the gear holder 15. Therefore, the ring gear 7 moves to substantially the right in the drawing, whereby the internal teeth 10 of the ring gear 7 are meshed with the external teeth 13 of the pinion 12 as shown in FIG. 4(b).

The ring gear 7 rotates in the belt-winding direction (counter-clockwise direction) because the lever 8 is pushed through the force transmitting members 3 by the pushing force of the piston 4 receiving the gas pressure. Because of the rotation of the ring gear 7, the pinion 12 starts to rotate in the same direction so that the reel shaft 13 starts to rotate in the same direction, thereby starting the winding-up operation of the seat belt.

The respective force transmitting members 3 and the piston 4 move in the counter-clockwise direction according to the rotation of the ring gear 7 due to the pushing force of the piston 4 receiving the gas pressure. The front-most force transmitting member 3 is positioned between the lever 8 and an adjacent lever 9 and the next two force transmitting members 3 are positioned between the lever 9 adjacent to the lever 8 and the next lever 9. After that, subsequent two force transmitting members 3 fit in the space between subsequent two levers in the same manner. The force transmitting member 3 out of the engagement with the levers 8, 9 is forced out from the end 2a of the pipe 2 and is received by the casing 14.

Due to rotation of the reel shaft 13, the seat belt is wound up, thereby removing slack of the seat belt and also applying tension to the seat belt to increase the force of restraining the occupant.

In the conventional seat belt retractor having such a pretensioner, the seat belt is wound up in a predetermined manner by the operation of the aforementioned pretensioner and subsequently the seat belt is also loaded to be withdrawn by inertia force of the occupant so that torque is applied to the reel shaft in the belt-unwinding direction. However, even though the torque is applied to the reel shaft in the belt-unwinding direction, the locking mechanism of the seat belt retractor locks the reel shaft from rotating in the belt-unwinding direction, thereby preventing the seat belt from being withdrawn. A variety of seat belt retractors have been developed, which are provided with an energy absorbing (hereinafter, sometimes referred to as "EA") mechanism for absorbing impact energy in order to soften the impact which is applied against the occupant by the seat belt stopped from being withdrawn.

Generally, EA mechanisms to be integrally assembled in the retractors include a torsion bar. The torsion bar is designed such that one end thereof is locked from rotating in the belt-unwinding direction by the locking mechanism when actuated and the other end thereof is rotated together with the reel shaft in the belt-unwinding direction so that the torsion bar is twisted and deformed to allow the seat belt to be withdrawn, thereby absorbing impact energy.

The restraining force on the occupant and impact absorption can be improved by adapting the PT 1 as disclosed in the aforementioned publication to the seat belt retractor with such an EA mechanism.

However, certain problems result from adapting the PT 1 to a seat belt retractor having an EA mechanism. The operation of a seat belt retractor having both a PT 1 and an EA mechanism will now be considered. As shown in FIG. 5(a), the piston 4 receives gas pressure from the gas generator 6 during the operation of the PT 1, whereby the piston 4 is pressed against the adjacent force transmitting member 3. At this point, since the contact face of the force transmitting member 3 relative to the piston 4 is spherical and the force transmitting member 3 is harder to be deformed than the piston 4, the piston 4 is expected to be deformed in the operational direction of gas pressure (the force transmitting member 3 side of the piston 4 is collapsed and deformed) as shown in FIG. 5(b). Then, the deformed portion of the piston 4 may wedge into space between the outer spherical surface of the force transmitting member 3 and the inner peripheral surface of the pipe 2.

As the EA mechanism is actuated soon after the actuation of the PT 1, the reel shaft 11 rotates in the belt-unwinding direction because of the torsional deformation of the torsion bar. Therefore, force produced by the withdrawing of the seat belt is applied to the respective force transmitting members 3 in the direction opposite to that of the operation of the PT 1, as shown in FIG. 5(c). Then, the respective force transmitting members 3 are returned to the original positions so that the spherical surface of the force transmitting member 3 presses the piston 4. Since the piston 4 is easier to be deformed than the force transmitting members 3, the piston 4 is further deformed and the deformed portion of the piston 4 further wedges into the space between the spherical surface of the force transmitting member 3 and the inner peripheral surface of the pipe 2, thus disturbing the smooth movement of the force transmitting members 3.

Though, even when the smooth movement of the force transmitting members 3 is disturbed, the EA mechanism exhibits its EA function itself, it is preferable that the EA mechanism exhibits more effectively its EA function.

SUMMARY OF THE INVENTION

The present invention was made for under the aforementioned circumstances and the object of the present invention is to provide a pretensioner having a plurality of force transmitting members, in which a piston as force receiving member is designed to be hardly deformed, thereby allowing further smooth movement of the force transmitting members.

According to the present invention, a pretensioner is provided comprising: a plurality of force transmitting members which are guided along a predetermined tube path and are arranged to transmit force to a reel shaft for rotating the reel shaft in a belt-winding direction; a gas generator for generating gas in the event of emergency; and a piston which is guided along the tube path and receives gas pressure of the gas to push the force transmitting members, wherein the force produced by the piston when receiving gas from the gas generator in the event of emergency is transmitted to the reel shaft via the force transmitting members so as to rotate the reel shaft in the belt-winding direction to wind up a seat belt, and wherein one of the force transmitting members which is directly adjacent to the piston has a flat face to be in contact with the piston.

According to another embodiment of the present invention, all of the other the force transmitting members except the force transmitting member directly adjacent to the piston are formed in balls made of metal such as iron or aluminum.

According to another embodiment of the present invention, the force transmitting member directly adjacent to the piston is formed into any one of a barrel-like shape, a (column+hemisphere) shape, and a (truncated circular cone+partial sphere) shape.

Further, according to yet another embodiment of the present invention, the force transmitting member directly adjacent to the piston is made of metal such as iron or aluminum.

Furthermore, according to another embodiment of the present invention, the piston is formed into any one of a ball-shape, a barrel-like shape, a (column+hemisphere) shape, and a (truncated circular cone+partial sphere) shape from resin such as silicone rubber.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 1(a)–1(c) show one embodiment of a pretensioner according to the present invention, wherein FIG. 1(a) is an illustration showing a piston and force transmitting members in a state before the operation of the pretensioner. FIG. 1(b) is an illustration showing the piston and the force transmitting members in a state during the operation of the pretensioner. FIG. 1(c) is an illustration showing the piston and the force transmitting members in a state during the operation of EA.

FIGS. 2(a)–2(c) show the force transmitting member directly adjacent to the piston, wherein FIG. 2(a) is an illustration showing a barrel-like force transmitting member. FIG. 2(b) is an illustration showing a (column+hemisphere) shaped force transmitting member. FIG. 2(c) is an illustration showing a (truncated circular cone+partial sphere) shaped force transmitting member.

FIGS. 3a-3k and FIGS. 3m-3s are illustrations showing various embodiments of the present invention employing different combinations between the piston and the force transmitting member.

FIGS. 4(a), 4(b) show a pretensioner disclosed in Japanese Patent Unexamined Publication No. 2001-63519, wherein FIG. 4(a) is a sectional view showing the pretensioner in non-operational state and FIG. 4(b) is a sectional view similar to FIG. 4(a) but showing the pretensioner during winding-up a seat belt.

FIGS. 5(a)–5(c) are illustrations for explaining the behaviors of the pretensioner shown in FIGS. 4(a), 4(b), wherein FIG. 5(a) is an illustration showing a piston and force transmitting members in a state before the operation of the PT, FIG. 5(b) is an illustration showing the piston and the force transmitting members in a state during the operation of the PT, and FIG. 5(c) is an illustration showing the piston and the force transmitting members in a state during the operation of EA.

DETAILED DESCRIPTION

Figure 2A:
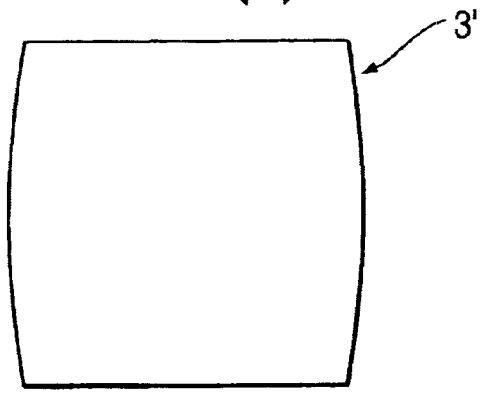

Hereinafter, embodiments of the present invention will be described with reference to the attached drawings.

FIGS. 1(a)–1(c) are illustrations similar to FIGS. 5(a)–5(c), partially showing one embodiment of the pretensioner according to the present invention. Parts of the following embodiment similar or corresponding to the parts of the conventional example will be marked by the same reference numerals and the detail description of the parts will be omitted.

As shown in FIG. 1(a), a pretensioner of this embodiment comprises a piston 4 made of resin such as silicone rubber enabling the enlargement of the diameter of the piston 4 for exhibiting the sealing function, similarly to the piston 4 of the aforementioned conventional pretensioner. A force transmitting member 3' directly adjacent to the piston 4 is formed in a barrel-like shape. As shown in FIG. 2(a), the barrel-like force transmitting member 3' is formed in such a configuration that the outer peripheral surface swells at its middle portion, the both end faces (upper and lower end faces) are flat, and all-around peripheral edges of both the end faces are rounded or chamfered. The rounding or chamfering of all-around peripheral edges of the end faces allows the smooth movement of the force transmitting member 3' within the pipe 2 and prevents the inner peripheral surface of the pipe 2 from being scraped due to sliding friction. The barrel-like force transmitting member 3' is arranged adjacent to the piston 4 within the pipe 2 and other force transmitting members 3 (preferably ball shaped as in the conventional example) are arranged one after another to be in contact with each other. The contact face of the force transmitting member 3' relative to the piston 4 is flat.

The barrel-like force transmitting member 3' is made of metal such as iron or aluminum just like the force transmitting members 3 of the aforementioned conventional example. However, the force transmitting member 3' is not limited thereto and may be made of the same material as the piston 4, i.e. resin such as silicone rubber. All of the force transmitting members 3 except the force transmitting member 3' adjacent to the piston 4 are preferably made of metal such as iron or aluminum, similarly to the conventional example.

The general structure of the pretensioner and the structure of the seat belt retractor with EA mechanism according to this embodiment of the present invention are generally the same as those of the pretensioner 1 and the seatbelt retractor with EA mechanism discussed above.

According to the present invention, as the piston 4 receives the gas pressure from the gas generator 6, the piston 4 presses the adjacent force transmitting member 3' as shown in FIG. 1(a). Accordingly, the diameter of the piston 4 is enlarged so as to exhibit the sealing function. A portion of the piston 4 on the barrel-like force transmitting member 3' side is deformed so as to wedge into the space between the outer peripheral surface of the barrel-like force transmitting member 3' and the inner peripheral surface of the pipe 2, as shown in FIG. 1(b). As belt withdrawing force is produced by the inertia force of an occupant after the winding action of the seat belt by the PT 1, the EA mechanism is actuated to conduct the EA action, thereby absorbing the impact energy.

As the seat belt is withdrawn by the EA action of the EA mechanism, the reel shaft 11 is rotated in the belt-unwinding direction. Force produced by the withdrawing of the seat belt is applied to the respective force transmitting members 3. This force is transmitted to the barrel-like force transmitting member 3' so that the force transmitting member 3' presses the piston 4 backward. At this point, since the lower end face (i.e. the contact face to the piston 4) of the barrel-like force transmitting member 3' is flat, the force transmitting member 3' is in plane contact with the piston 4. However, unlike the conventional example discussed above, because of the barrel-like shape of the force transmitting member 3', the wedging amount of the piston 4 into the space between the outer peripheral surface of the force transmitting member 3' and the inner peripheral surface of the pipe 2 is small, as shown in FIG. 1(c).

According to the pretensioner of this embodiment, since the wedging amount of the piston into the space between the outer peripheral surface of the force transmitting member 3' and the inner peripheral surface of the pipe 2 can be reduced, the barrel-like transmitting member 3', the other force transmitting members 3, and the piston 4 can smoothly move together within the pipe 2. The smooth movement of the force transmitting members 3, 3' and the piston 4 allows the effective EA action of the EA mechanism.

Since all of the force transmitting members 3 except the force transmitting member 3' adjacent to the piston 4 are composed of balls made of metal such as iron or aluminum, the deformation of the balls during force transmission are reduced and the balls can smoothly move within the pipe 2, thereby minimizing the force loss and further effectively transmitting the force of gas pressure produced by the gas generator 6 to the reel shaft 11. In addition, since all of the components except the force transmitting member 3' adjacent to the piston 4 may be composed of components of the conventional PT, the pretensioner of this embodiment can be manufactured at low cost without large-scale design change.

Further, since the force transmitting member 3' adjacent to the piston 4 is formed in a barrel-like shape, the force transmitting member 3' can be simple in shape and is easy to be manufactured.

Since the force transmitting member 3' adjacent to the piston 4 is made of metal such as iron or aluminum, that is, made of the same material as the force transmitting members 3. The force transmitting member 3' can be easily manufactured at low cost. In addition, when the force transmitting member 3' is made of metal such as iron or aluminum, the deformation of the force transmitting member 3' during force transmission is small, thereby eliminating the force loss and further effectively transmitting the force of gas pressure produced by the gas generator 6 to the reel shaft 11.

Furthermore, since the piston 4 is formed into a ball from resin such as silicone rubber, the piston 4 can be simple in shape and can be made of the same material as the conventional piston 4 so that the piston 4 is easy to be manufactured at low cost.

The other actions, operation and effects of the pretensioner of this embodiment are generally the same as those of the pretensioner 1 of the aforementioned conventional example. The actions, operations and effects of the seat belt retractor having EA mechanism are also generally the same as those of the seat belt retractor having EA mechanism of the aforementioned conventional example.

Figure 2B:
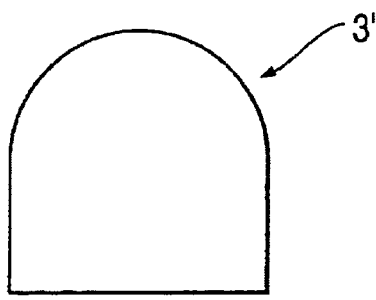

The shape of the force transmitting member 3' directly adjacent to the piston 4 is not limited to the aforementioned barrel-like shape and may have various shapes. For example, the force transmitting member 3' may be formed in a (column+hemisphere) shape which is a combination of one portion which is hemispherical and the other portion which is columnar as shown in FIG. 2(b). In this case, the lower end face of the force transmitting member 3' is flat and the diameter of the hemisphere and the diameter of the column are set to be the same as the diameter of the other force transmitting members 3 composed of balls, respectively. The all-around peripheral edge of the end face of the column side is rounded or chamfered in the same manner as the case of the barrel-like force transmitting member 3'. The force transmitting member 3' of this embodiment may be made of metal such as iron or aluminum just like the barrel-like force transmitting member 3' of the aforementioned embodiment.

The other structure, the other actions, and the other works and effects of the pretensioner employing the force transmitting member 3' of this embodiment of the present invention may be the same as those of the pretensioner employing the barrel-like force transmitting member 3' of the aforementioned embodiment.

Figure 2C:
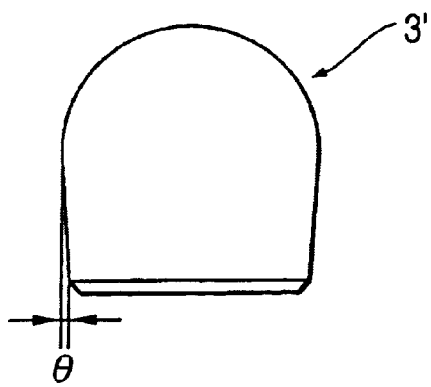
Figure 4A:
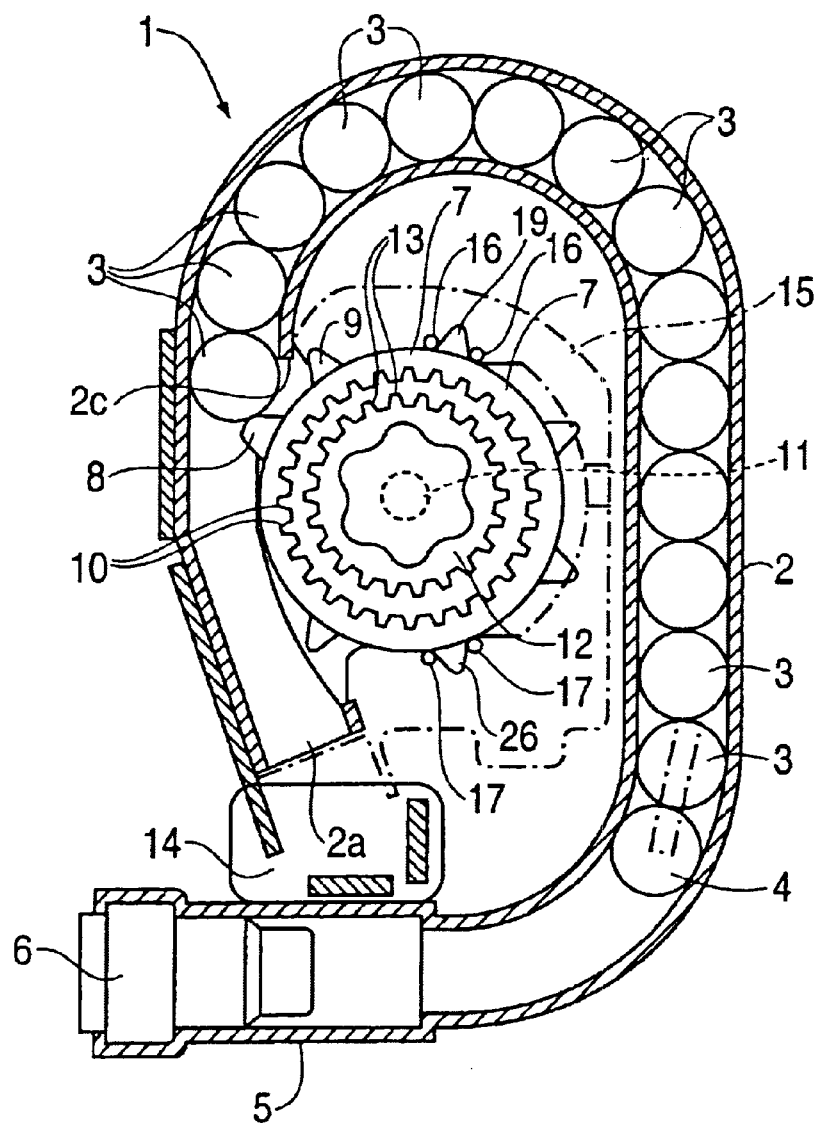
Figure 4B:
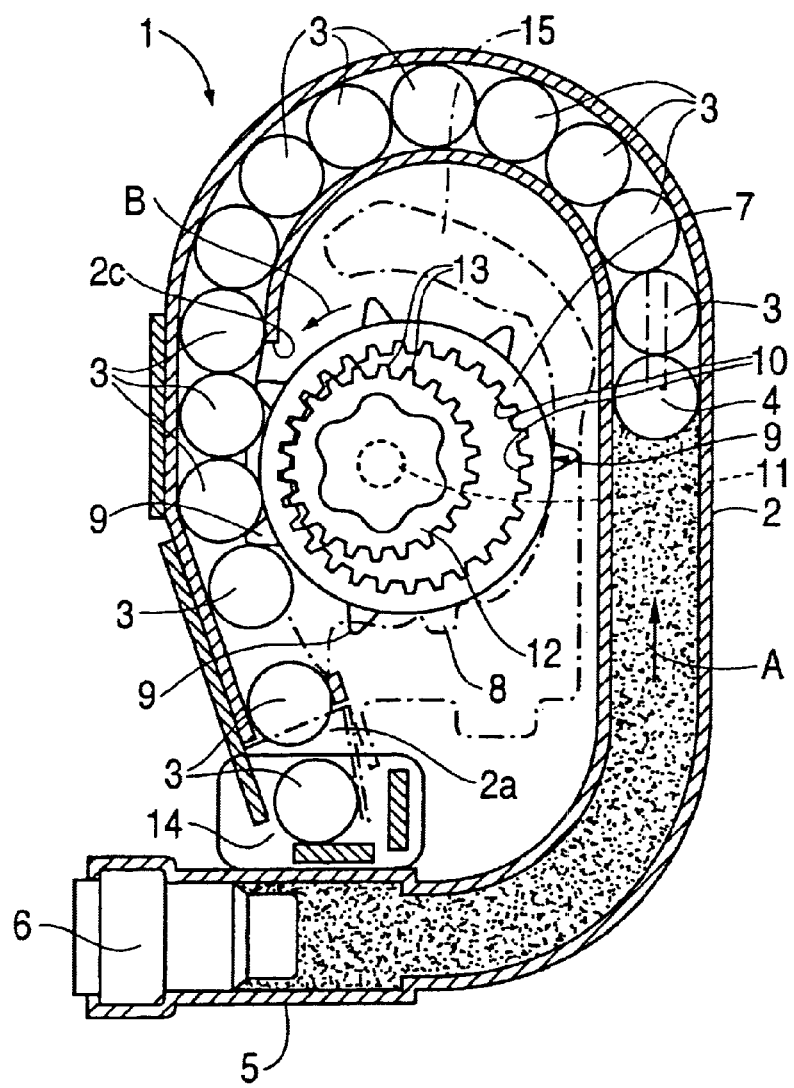

Moreover, the force transmitting member 3' may also be formed in a (truncated circular cone+partial sphere) shape which is a combination of one portion which is partially spherical closer to spherical than hemisphere and the other portion which is truncated circular cone as shown in FIG. 2(c). In this case, the lower end face of the force transmitting member 3' is flat and the diameter of the partial sphere is set to be the same as the diameter of the other force transmitting members 3 composed of balls.

The all-around peripheral edge of the end face of the truncated circular cone side is rounded or chamfered in the same manner as the case of the barrel-like force transmitting member 3'. The outer surface of the truncated circular cone portion is tapered toward the other end (i.e. toward the lower end in FIG. 2(c)) to have a taper angle BETA so that the diameter of the truncated circular cone portion is gradually reduced toward the other end. By setting the taper angle BETA for the outer peripheral surface of the truncated circular cone portion, the force transmitting member 3' is allowed to move smoothly even through a portion of the pipe 2 having the smallest radius of curvature. The force transmitting member 3' of this embodiment may also be made of metal such as iron or aluminum just like the barrel-like force transmitting member 3' of the aforementioned embodiment.

The other structure, the other actions, and the other works and effects of the pretensioner employing the force transmitting member 3' of this embodiment of the present invention may be the same as those of the pretensioner employing the barrel-like force transmitting member 3' of the aforementioned embodiment.

Though the piston 4 is formed in a ball in the aforementioned embodiment, the piston 4 of the present invention is not limited to the ball and may be formed in the same shape of the aforementioned force transmitting member 3' directly adjacent to the piston. That is, the piston 4 may be formed in the barrel-like shape as shown in FIG. 2(a), the (column+hemisphere) shape as shown in FIG. 2(b), or the (truncated circular cone+partial sphere) shape as shown in FIG. 2(c). It should be understood that, in this case, the piston 4 is made of resin having sealing function such as silicone rubber in the same manner as the aforementioned embodiment.

FIGS. 3(a)–3(k) and FIGS. 3(m)–3(s) are illustrations of embodiments of the present invention that employ various of combinations of the force transmitting members 3' and the pistons 4 having the aforementioned shapes. These figures are summarized briefly below.

FIG. 3(a) shows an embodiment of the present invention similar to the embodiment of the present invention shown in FIGS. 1(a)–1(c) and FIG. 2(a), which is a combination of the barrel-like force transmitting member 3' and the piston 4.

FIG. 3(b) shows an embodiment of the present invention which is a combination of the barrel-like force transmitting member 3' and the barrel-like piston 4.

FIG. 3(c) shows an embodiment of the present invention which is a combination of the barrel-like force transmitting member 3' and the (column+hemisphere) shaped piston 4 of which hemisphere side is arranged on the force transmitting member 3' side.

FIG. 3(d) shows an embodiment of the present invention which is a combination of the barrel-like force transmitting member 3' and the (column+hemisphere) shaped piston 4 of which the column side is arranged on the force transmitting member 3' side.

FIG. 3(e) shows an embodiment of the present invention which is a combination of the barrel-like force transmitting member 3' and the (truncated circular cone+partial sphere) shaped piston 4 of which the partial sphere side is arranged on the force transmitting member 3' side.

FIG. 3(f) shows an embodiment of the present invention which is a combination of the barrel-like force transmitting member 3' and the (truncated circular cone+partial sphere) shaped piston 4 of which the truncated circular cone side is arranged on the force transmitting member 3' side.

Further, FIG. 3(g) shows an embodiment of the present invention which is a combination of the (column+hemisphere) shaped force transmitting member 3' of which hemisphere side is arranged on the force transmitting member 3 side (the upper side in this drawing) and the piston 4.

FIG. 3(h) shows an embodiment of the present invention which is a combination of the (column+hemisphere) shaped force transmitting member 3' of which hemisphere side is arranged on the force transmitting member 3 side and the barrel-like piston 4.

FIG. 3(i) shows an embodiment of the present invention which is a combination of the (column+hemisphere) shaped force transmitting member 3' of which hemisphere side is arranged on the force transmitting member 3 side and the (column+hemisphere) shaped piston 4 of which hemisphere side is arranged on the force transmitting member 3' side.

FIG. 3(j) shows an embodiment of the present invention which is a combination of the (column+hemisphere) shaped force transmitting member 3' of which hemisphere side is arranged on the force transmitting member 3 side and the (column+hemisphere) shaped piston 4 of which column side is arranged on the force transmitting member 3' side.

FIG. 3(k) shows an embodiment of the present invention which is a combination of the (column+hemisphere) shaped force transmitting member 3' of which hemisphere side is arranged on the force transmitting member 3 side and the (truncated circular cone+partial sphere) shaped piston 4 of which partial sphere side is arranged on the force transmitting member 3' side.

FIG. 3(*m*) shows an embodiment of the present invention which is a combination of the (column+hemisphere) shaped force transmitting member 3' of which hemisphere side is arranged on the force transmitting member 3 side and the (truncated circular cone+partial sphere) shaped piston 4 of which truncated circular side is arranged on the force transmitting member 3' side.

Furthermore, FIG. 3(*n*) shows an embodiment of the present invention which is a combination of the (truncated circular cone+partial sphere) shaped force transmitting member 3' of which partial sphere side is arranged on the force transmitting member 3 side and the piston 4.

FIG. 3(*o*) shows an embodiment of the present invention which is a combination of the (truncated circular cone+partial sphere) shaped force transmitting member 3' of which partial sphere side is arranged on the force transmitting member 3 side and the barrel-like piston 4.

FIG. 3(*p*) shows an embodiment of the present invention which is a combination of the (truncated circular cone+partial sphere) shaped force transmitting member 3' of which partial sphere side is arranged on the force transmitting member 3 side and the (column+hemisphere) shaped piston 4 of which hemisphere side is arranged on the force transmitting member 3' side.

FIG. 3(*q*) shows an embodiment of the present invention which is a combination of the (truncated circular cone+partial sphere) shaped force transmitting member 3' of which partial sphere side is arranged on the force transmitting member 3 side and the (column+hemisphere) shaped piston 4 of which column side is arranged on the force transmitting member 3' side.

FIG. 3(*r*) shows an embodiment of the present invention which is a combination of the (truncated circular cone+partial sphere) shaped force transmitting member 3' of which partial sphere side is arranged on the force transmitting member 3 side and the (truncated circular cone+partial sphere) shaped piston 4 of which partial sphere side is arranged on the force transmitting member 3' side.

FIG. 3(*s*) shows an embodiment of the present invention which is a combination of the (truncated circular cone+partial sphere) shaped force transmitting member 3' of which partial sphere side is arranged on the force transmitting member 3 side and the (truncated circular cone+partial sphere) shaped piston 4 of which truncated circular cone side is arranged on the force transmitting member 3' side.

In any of the aforementioned embodiments, the contact face of the force transmitting member 3' to the piston 4 is flat so that the force transmitting member 3' and the piston 4 are in plane contact with each other.

The barrel-like force transmitting members 3' in the embodiments shown in FIGS. 3(*a*)–3(*f*), the (column+hemisphere) shaped force transmitting members 3' in the embodiments shown in FIGS. 3(*g*)–(*k*) and 3(*m*), and the (truncated circular cone+partial sphere) shaped force transmitting members 3' in the embodiments shown in FIGS. 3(*n*)–3(*s*) are made of metal such as iron or aluminum as mentioned above. By any of the aforementioned combinations of the force transmitting member 3' and the piston 4, even when belt-withdrawing force is applied to the force transmitting members 3, 3' and the piston 4 due to the EA operation, the wedging of the piston 4 can be effectively prevented so as to allow the smooth movement the force transmitting members 3, 3' and the piston 4 during the EA operation, thereby effectively exhibiting the EA action.

Though the force transmitting member 3' adjacent to the piston 4 is formed in the barrel-like shape, the (column+hemisphere) shape, or the (truncated circular cone+partial sphere) shape in the above description, the shape of the force transmitting member 3' is not limited thereto. The force transmitting member 3' may be formed in any shape having a flat face to be in contact with the piston 4.

Though the force transmitting members 3 except the force transmitting member 3' are formed in the ball shape in the above description, the shape of the force transmitting members 3 is not limited thereto. The force transmitting members 3 may be formed in any shape enabling the smooth movement in the pipe 2, for example, a column shape, a shape composed of a (column+truncated circular cone) shape and a truncated circular cone shape which are integrally formed such that the ends having larger diameter face to each other.

As apparent from the aforementioned description, the contact face of a force transmitting member, directly adjacent to a piston, relative to the piston is set to be flat so that the force transmitting member is in plane contact with the piston and presses the piston from this state, thereby reducing the space between the outer peripheral surface of the force transmitting member and the inner peripheral surface of the tube path and reducing the wedging amount of the piston into the space. Therefore, by allowing the smooth return of the piston and a plurality of force transmitting members, the EA action is effectively conducted.

As mentioned above, in the pretensioner according to the present invention, soon after the piston pushes the force transmitting members because of the operation of PT so that the piston and the force transmitting members are moved along the predetermined tube path, the force transmitting members are pressed backward due to the operation of EA. During this, since the contact face of the force transmitting member, directly adjacent to the piston, relative to the piston is set to be flat, the force transmitting member is in plane contact with the piston and presses the piston from this state. Therefore, the space between the outer peripheral surface of the force transmitting member and the inner peripheral surface of the tube path is reduced and a portion of the piston on the force transmitting member side is deformed so that the piston and the force transmitting member directly adjacent thereto are in plane contact with each other, thereby reducing the wedging amount of the piston into the space. This allows the smooth return of the piston and a plurality of force transmitting members, thereby effectively conducting the EA action.

According to an embodiment of the present invention since all of the force transmitting members except the force transmitting member directly adjacent to the piston are composed of balls made of metal such as iron or aluminum, the deformation of the balls during force transmission are reduced and the balls can smoothly move within the tube path, thereby minimizing the force loss and further effectively transmitting the force of gas pressure produced by the gas generator to the reel shaft. In addition, since all of the components except the force transmitting member directly adjacent to the piston may be composed of components of the conventional pretensioner, the pretensioner of the present invention can be manufactured at low cost without large-scale design change.

According to an embodiment of the present invention, since the force transmitting member directly adjacent to the piston is formed in any one of a barrel-like shape, a (column+hemisphere) shape, and a (truncated circular cone+partial sphere) shape, the force transmitting member can be simple in shape and is easy to be manufactured.

According to an embodiment of the present invention, since the force transmitting member directly adjacent to the piston is made of metal such as iron or aluminum, the force transmitting member can be easily manufactured at low cost from the same material as the conventional example. In addition, the deformation of the force transmitting member during force transmission is small, thereby eliminating the force loss and further effectively transmitting the force of gas pressure produced by the gas generator to the reel shaft.

According to an embodiment of the present invention, since the piston is formed into any one of a ball shape, a barrel-like shape, a (column+hemisphere) shape, and a (truncated circular cone+partial sphere) shape from resin such as silicone rubber, the piston can be simple in shape and can be made of the same material as the conventional piston so that the piston is easy to be manufactured at low cost.

The priority application, Japanese Patent Application, Number 2001-241785, filed Aug. 9, 2001 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pretensioner comprising:
    a plurality of force transmitting members which are guided along a predetermined tube path and are arranged to transmit force to a reel shaft for rotating the reel shaft in a belt-winding direction;
    a gas generator for generating gas in the event of emergency; and
    a piston which is guided along the tube path and receives gas pressure of the gas to push the force transmitting members,
    wherein the force produced by the piston when receiving gas from the gas generator in the event of emergency is transmitted to the reel shaft via the force transmitting members so as to rotate the reel shaft in the belt-winding direction to wind up a seat belt, and
    wherein one of the force transmitting members which is directly adjacent to the piston has a flat face configured to be in contact with the piston.

2. The pretensioner of claim 1, wherein all of the other the force transmitting members except the force transmitting member directly adjacent to the piston are formed as balls.

3. The pretensioner of claim 2, wherein the balls are formed of metal.

4. The pretensioner of claim 3, wherein the balls are formed of aluminum or iron.

5. The pretensioner of claim 1, wherein the force transmitting member directly adjacent to the piston is formed in a barrel shape.

6. The pretensioner of claim 1, wherein the force transmitting member directly adjacent to the piston comprises two portions, one portion being configured in the shape of a column and the other portion configured in the shape of a hemisphere.

7. The pretensioner of claim 1, wherein the force transmitting member directly adjacent to the piston comprises two portions, one portion being in the shape of a truncated circular cone and the other portion comprising part of a sphere.

8. The pretensioner of claim 1, wherein the force transmitting member directly adjacent to the piston is made of metal.

9. The pretensioner of claim 8, wherein the metal includes iron or aluminum.

10. The pretensioner of claim 1, wherein the piston is formed in the shape of a ball.

11. The pretensioner of claim 1, wherein the piston is formed in the shape of a barrel.

12. The pretensioner of claim 1, wherein the piston comprises two portions, one portion being formed in the shape of a column and the other portion being formed in the shape of a hemisphere.

13. The pretensioner of claim 1, wherein the piston comprises two portions, one portion being formed in the shape of a truncated circular cone and the other portion forming a part of a sphere.

14. The pretensioner of claim 1, wherein the piston comprises a resin material.

15. The pretensioner of claim 14, wherein the resin material comprises silicone rubber.

16. A seat belt retractor having a pretensioner comprising:
    a plurality of force transmitting members which are guided along a tube and are arranged to transmit force to a reel shaft in a belt-winding direction; and
    a piston directly adjacent to one of the force transmitting members, the piston configured to push the force transmitting members along the tube in response to gas pressure generated by a gas generator,
    wherein the force transmitting member directly adjacent to the piston includes a flat face positioned to be in contact with the piston when the force transmitting members are being pushed by the piston.

* * * * *